(12) United States Patent
Yang

(10) Patent No.: US 7,257,912 B2
(45) Date of Patent: Aug. 21, 2007

(54) ANTI-THEFT LICENSE PLATE HOLDER

(76) Inventor: David Ue-Ming Yang, 1020 Wickham Dr., Moraga, CA (US) 94556

( * ) Notice: Subject to any disclaimer, the term of this patent is extended or adjusted under 35 U.S.C. 154(b) by 0 days.

(21) Appl. No.: 11/328,600

(22) Filed: Jan. 11, 2006

(65) Prior Publication Data

US 2007/0157495 A1 Jul. 12, 2007

(51) Int. Cl.
*G09F 11/18* (2006.01)
(52) U.S. Cl. .......................................... 40/201; 40/209
(58) Field of Classification Search ................. 40/201, 40/200, 202; 70/63, 232, 465, 92; 180/289, 180/287; 116/33; 307/10.2; 312/245, 242
See application file for complete search history.

(56) References Cited

U.S. PATENT DOCUMENTS

| | | | | |
|---|---|---|---|---|
| 3,805,231 A | * | 4/1974 | Santoli | 307/10.3 |
| 5,983,539 A | * | 11/1999 | Martin et al. | 40/202 |
| 6,385,876 B1 | * | 5/2002 | Mc Kenzie | 40/201 |
| 6,485,081 B1 | * | 11/2002 | Bingle et al. | 296/76 |

* cited by examiner

*Primary Examiner*—Lesley D. Morris
*Assistant Examiner*—Christopher E Veraa

(57) ABSTRACT

A module unit is to be mounted to the exterior surface of a trunk door or rear door of a vehicle for displaying a license plate. Without requiring a key or special tool, the module unit protects the license plate from being removed by an un-authorized person. The license plate can only be removed when a locking unit in the module unit is unlocked by activating a release unit from the interior side of vehicle. Such a module unit also protects the annual registration stickers from being removed by an un-authorized person.

12 Claims, 9 Drawing Sheets

ANTI-THEFT LICENSE PLATE HOLDER

BACKGROUND OF THE INVENTION

The present invention relates to a holder assembly for retaining and displaying a vehicle license plate outside of a trunk door or rear door of a vehicle. The present invention particularly relates to a vehicle license plate holder that, without requiring a key or special tool, protects the license plate from being removed by an un-authorized person.

By law, a vehicle license plate must be displayed at least at the rear end of vehicle. Mechanical fasteners such as screws have always been used for fastening the plate to vehicle body. This presents a risk that the license plate can be removed by an un-authorized person. To prevent such a risk, a variety of lockable devices have been proposed in prior art that require a key or a special tool for removing the license plate. Using key or special tool is inconvenient and undesirable because the vehicle owner must maintain an extra key or special tool. This presents another risk of losing or missing the key or special tool when needed. Furthermore, most of the proposed lockable devices are unattractive in appearance.

Therefore, there is still a need for an improved license plate holder that, without requiring a key or special tool protects the vehicle license plate from being removed by an un-authorized person. The present invention suggests a locking and releasing units to be installed in the holder assembly. The releasing unit penetrates through the vehicle body of trunk door or rear door of the vehicle. To remove the license plate, the locking unit must be unlocked by activating the releasing unit from the interior side of vehicle. The present invention adopts such a novel strategy for protecting the license plate from being removed by an un-authorized person, which has never been disclosed in prior art. The present invention is also capable of protecting the annual registration stickers of the license plate from being removed by an un-authorized person. By law, such annual registration stickers must be displayed at the top right and left corners of the license plate.

SUMMARY OF THE INVENTION

An object of present invention is to provide a license plate holder that prevents the removal of the license plate by an un-authorized person.

Another object of present invention is to provide a license plate holder that prevents the removal of the annual registration stickers of the license plate by an un-authorized person.

Another object of present invention is to provide such a license plate holder that does not requires a key or special tool for the removal of the license plate.

Another object of present invention is to provide such a license plate holder that mainly comprises of integrally connected molded parts, and thus enables quick assembling of the holder.

Another object of present invention is to provide such a license plate holder that eliminates visible mechanical fasteners, and thus enhances the appearance of the holder.

Another object of present invention is to provide a rotating means that rotates the holder to a closed position to prevent the removal of the license plate by an un-authorized person.

Another object of present invention is to provide such a rotating means that rotates the holder to an open position to allow the removal of the license plate.

Another object of present invention is to provide a locking means that is normally at locked position when the holder is at the closed position.

Another object of present invention is to provide such a locking means that can be unlocked to allow the holder to rotate from the closed position to the open position.

Another object of present invention is to provide a releasing means for unlocking the locking means, which rotates the holder to the open position and enables the removal of the license plate.

Another object of present invention is to provide such a releasing means that can be solely activated for unlocking the locking means from the interior side of vehicle.

Another object of present invention is to provide such a rotating means, locking means and releasing means in inaccessible locations so that they can not be possibly tampered by an un-authorized person.

DETAILED DESCRIPTION OF THE PREFERRED EMBODIMENTS

The module unit of the license plate holder of present invention comprises of a pivotally connected stationary base unit and rotating frame unit.

Figure 1:
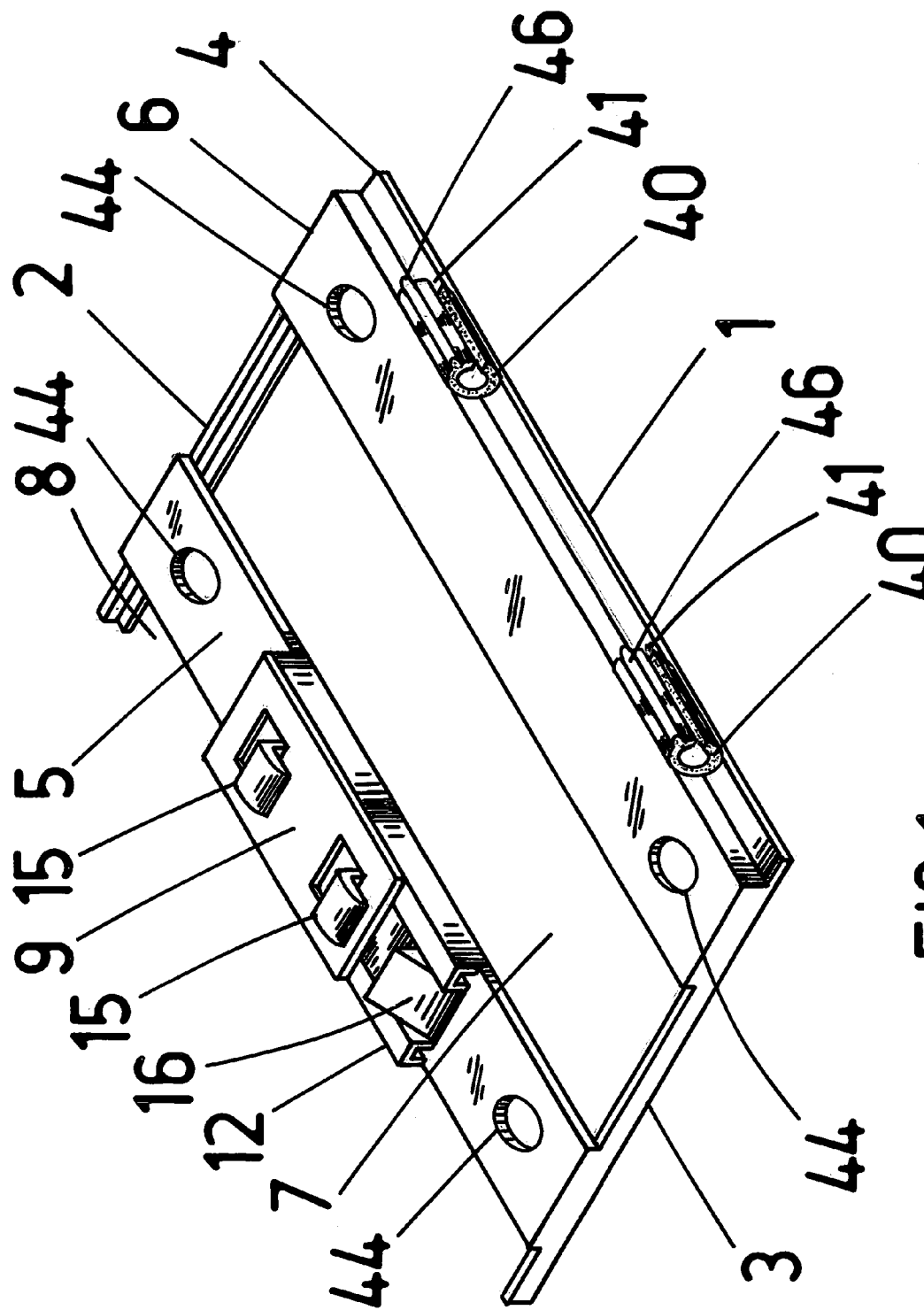
FIG. 1 is a rear perspective view of the frame unit in the first preferred embodiments of present invention.

FIG. 1 shows a rear view of the rotating frame unit 1 in the first preferred embodiments of present invention in a horizontal position, with the front of frame unit 1 facing downward. The frame unit 1 consists of a right side "L-channel" bar 2, a left side "L-channel" bar 3, a bottom side "L-channel" bar 4, and a first and second rear side cross plates 5 and 6, which are integrally connected to form an integral frame structure with a central cavity 7, and a top slot opening 8. A license plate (not shown) fits nicely within the central cavity 7 when the license plate is inserted into the central cavity 7 of frame unit 1 through top slot opening 8.

Figure 2:
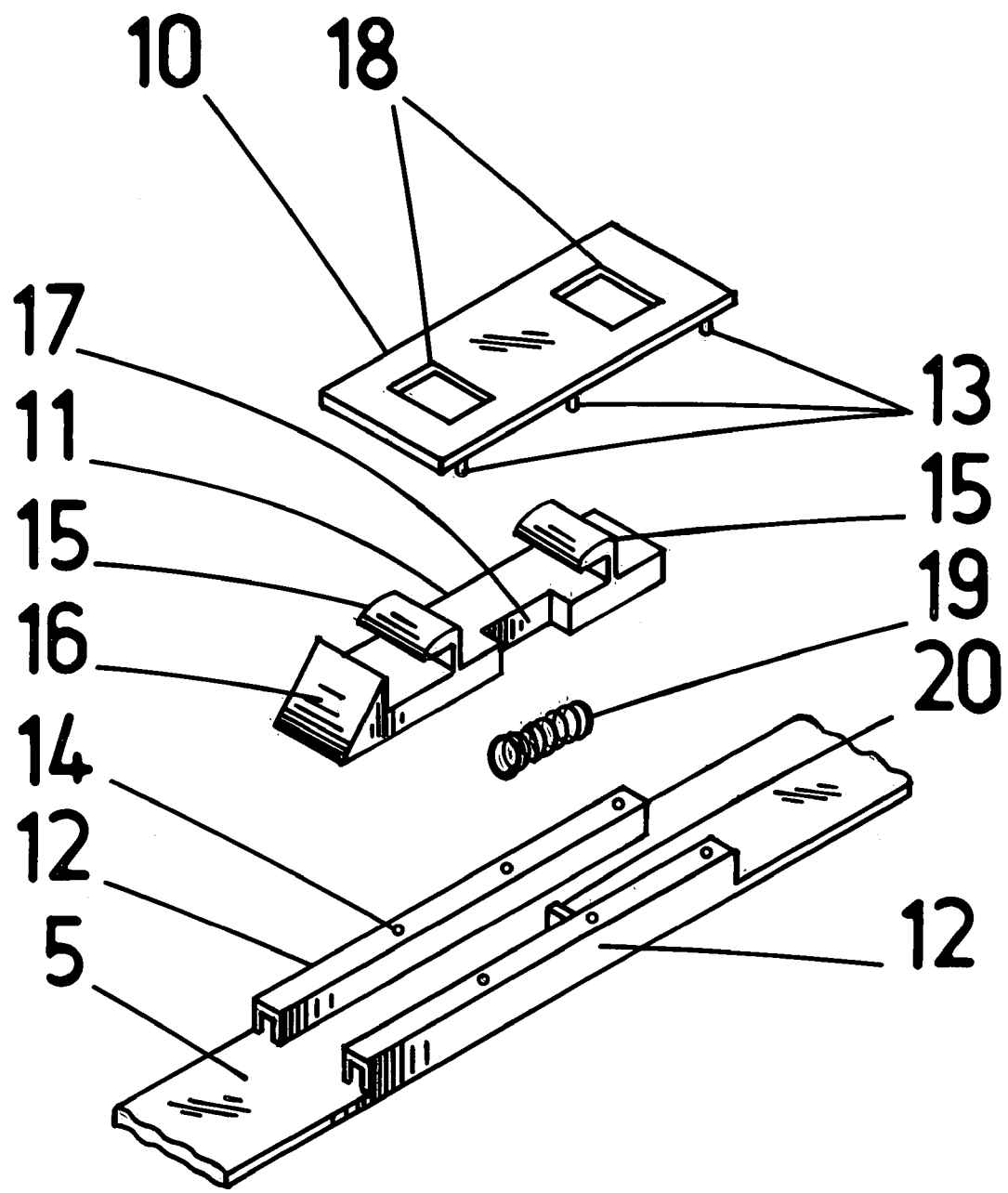
FIG. 2 is an exploded view of the locking unit that is installed in the frame unit (FIG. 1) of the first preferred embodiments of present invention.

The frame unit 1 is provided with a locking unit 9 at the rear side of first cross plate 5. FIG. 2 shows an exploded view of locking unit 9, which comprises of a top plate 10, a sliding plate 11, and a pair of parallel sliding tracks 12.

Sliding tracks 12 are the integral molded parts of cross plate 5. The bottom side of top plate 10 has a number of integral connectors 13, which allow an easy and quick connection with sliding tracks 12 through the matching holes 14 at the top sides of sliding tracks 12. The sliding plate 111 has a pair of integral "L-hooks" 15, a left end projectile 16, and a cavity 17. The top face of projectile 16 is facing leftward with an approximately 45 degree downward slope. The top plate 10 has a pair of windows 18. The locking unit 9 is assembled by placing a spring coil 19 within cavity 17, and placing the sliding plate 11 within the space between sliding tracks 12, with the right end of spring coil 19 being retained by an integral stop 20 of sliding tracks 12. The top plate 10 is then quickly connected to the top sides of sliding tracks 12, with "L-hooks" 15 of sliding plate 11 penetrating through windows 18 of top plate 10. After the locking unit 9 being assembled, sliding plate 11 is retained at an extreme left position by spring 19. The sliding plate 11 slides to an extreme right position when the top face of end projectile 16 being pushed downward by an external force. "L-hooks" 15 of locking unit 9 are positioned at locked and unlocked positions when sliding plate 11 is retained at extreme left and right positions respectively. Spring 19 causes sliding plate 11 to return from the extreme right position to the extreme left position upon releasing of the external force. It is understood that other types or forms of locking mechanism may also be suitable for use. It is not the intent of present invention to limit the type or form of the locking mechanism. Any deviation in the type or form of the locking unit is considered within the scope and spirit of present invention.

Figure 3:
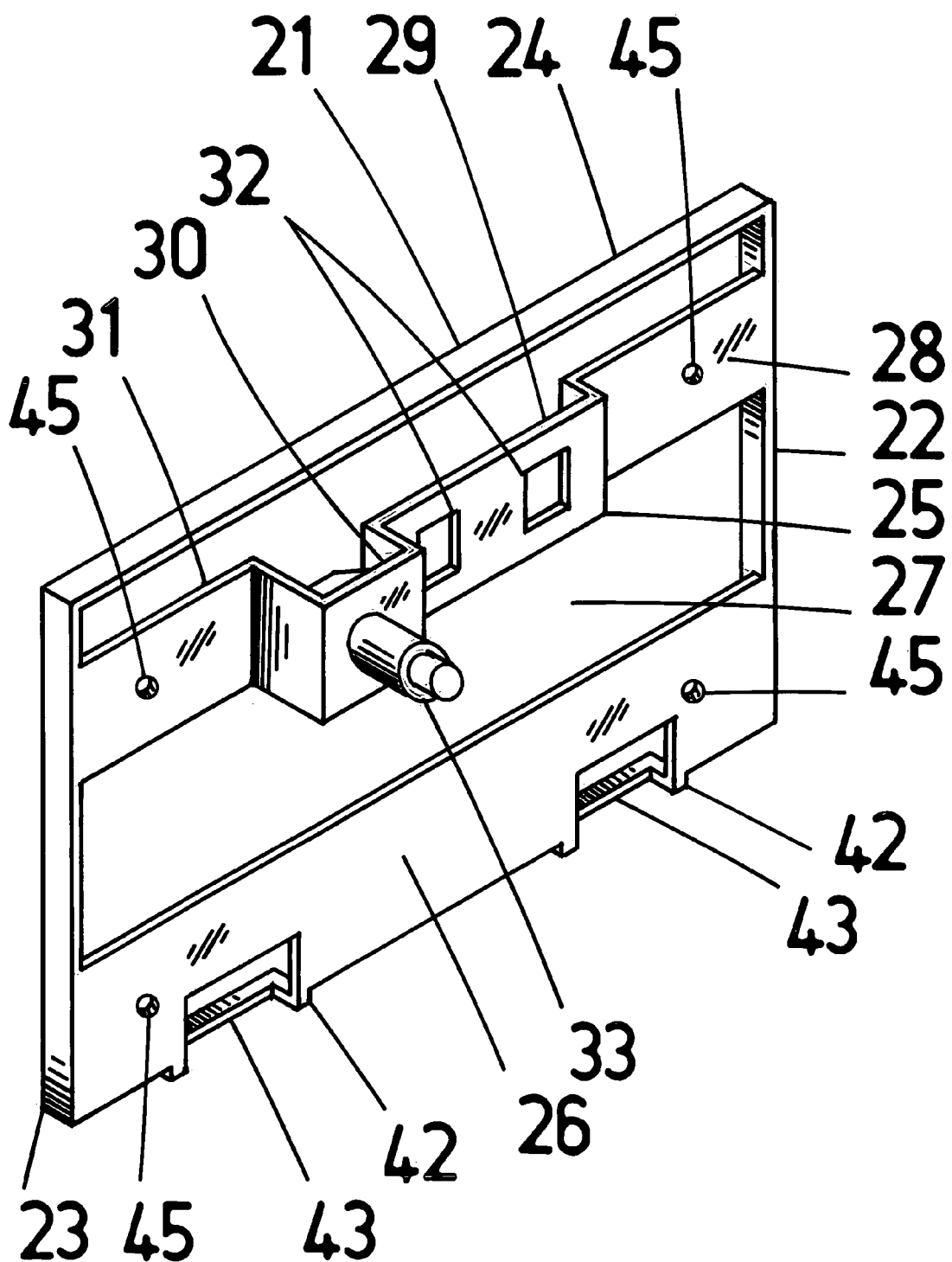
FIG. 3 is a rear perspective view of the base unit in the first preferred embodiments of present invention.

FIG. 3 show a rear view of the stationary base unit 21 in the first preferred embodiments of present invention in a vertical position. The base unit 21 consists of a vertical right side plate 22, a vertical left side plate 23, a horizontal top side plate 24, and a first and second rear side cross plates 25 and 26, which are integrally connected in the form of an integral frame structure with a central cavity 27. The cross plate 25 is divided into four sections, i.e., a right section 28, a right mid section 29, a left mid section 30, and a left section 31. The right mid section 29 is extended rearward with a pair of windows 32. The left mid section 30 is extended further rearward that incorporates a releasing unit 33. With an exception of the right and left mid sections 29 and 30 of cross plate 25, the rear sides of the entire frame structure of base unit 21 are flush to the exterior surface of the vehicle body when base unit 21 is attached to the vehicle body. Since the right and left mid sections 29 and 30 of cross plate 25 are extended rearward, a cavity must be prefabricated in the vehicle body to conceal them before base unit 21 can be attached to vehicle body.

Figure 4:
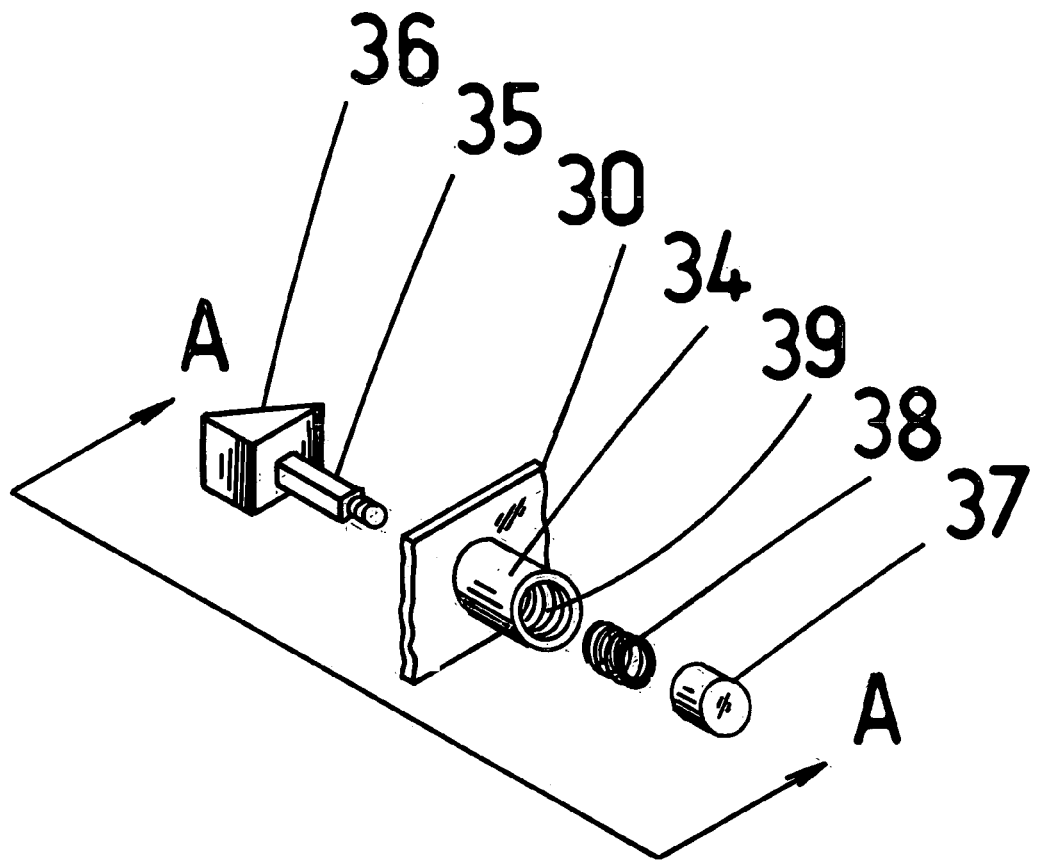
FIG. 4 is an exploded view of the releasing unit that is installed in the base unit (FIG. 3) of the first preferred embodiments of present invention.
Figure 4:
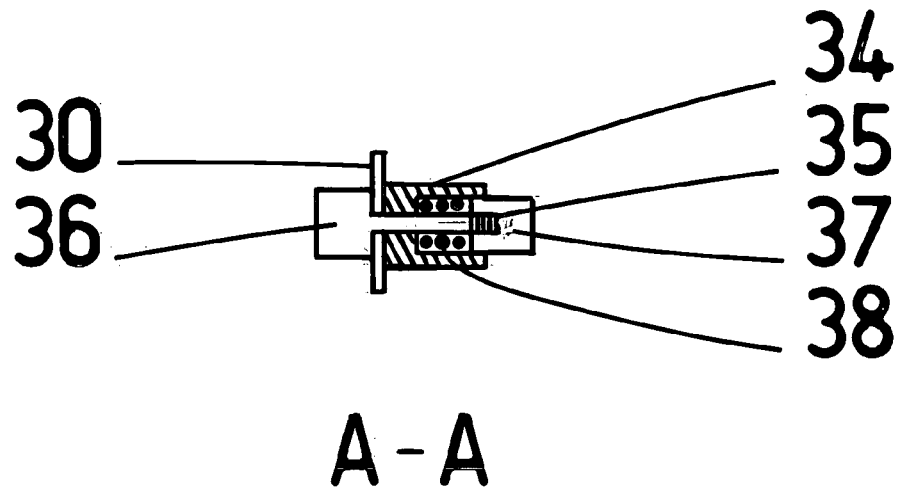

FIG. 4 shows an exploded view of releasing unit 33. The releasing unit 33 consists of a cylindrical bearing 34, a connecting rod 35, a projectile 36, a push button 37 and a spring 38. The cylindrical bearing 34 that penetrates through left mid section 30 of cross plate 25, is integrally connected to the rear side of cross plate 25. The connecting rod 35 is capable of sliding within cylindrical bearing 34, which is integrally connected with projectile 36 at the front end. The top face of projectile 36 has an approximately 45 degree slope. The releasing unit 33 is assembled by inserting connecting rod 35 into cylindrical bearing 34, placing spring 38 into a cavity 39 at the rear end of cylindrical bearing 34, and screwing the push button 37 onto the rear end of connecting rod 35. The connecting rod 35 is normally retained at an extreme rear position by spring 38. The connecting rods 35 slides forward to an extreme front position when push button 37 being pushed forward by an external force. Spring 38 enables connecting rod 35 to return to the extreme rear position upon releasing of the external force. It is understood that other types or forms of releasing mechanism may also be suitable for use. It is not the intent of present invention to limit the type or form of the releasing unit or locking unit. Any deviation in the type of form of the releasing or locking unit is considered within the scope and spirit of present invention.

The frame unit 1 and base unit 21 are pivotally connected together as a module unit by a pair of rotational joints. The female part of the rotational joint is in the form of a sleeve bearing 40 with a slot opening 41, which is an integral part of bottom "L-channel" bar 4 of frame unit 1. The male part of the rotational joint is in the form of a bracket 42 with a cross bar 43, which is an integral part of cross plate 26 of base unit 21. It is understood that other types or forms of rotational joints may also be suitable for use. It is not the intent of present invention to limit the type or form of the rotational joint. A deviation in the type or form of the rotational joint is considered within the scope and spirit of present invention.

The frame unit 1 and base unit 21 are positioned at horizontal and vertical positions respectively (FIG. 1 and FIG. 3) when they are pivotally connected. The rotational joint is connected by engaging cross bar 43 into sleeve bearing 40 through slot opening 41, in which, cross bar 43 serves as the center axis of rotation. After the rotational joints being connected, frame unit 1 is rotated clockwise from the horizontal position to the vertical position. At the vertical position, frame unit 1 fits nicely within cavity 27 of base unit 21. Wherein, "L-hooks" 15 of locking unit 9 penetrate through windows 32 of cross plate 25 of base unit 21, and thus enables the locking unit 9 to be engaged into the locked position. This results in locking frame unit 1 at the vertical position within base unit 21. When frame unit 1 is locked at the vertical position, the slot opening 8 of frame unit 1 is blocked by top plate 24 of base unit 21 so that license plate can not be possibly removed out of frame unit 1 through slot opening 8.

After locking frame unit 1 at the vertical position within base unit 21, the pivotally connected module unit can be mounted to vehicle body by fastening base unit 21 to vehicle body with mechanical fasteners. Through holes 44 are provided in frame unit 1 that allow mechanical fasteners to access the fastening holes 45 of base unit 21 for fastening base unit 21 to vehicle body.

After the module unit being mounted to vehicle body, frame unit 1 can be rotated counter clockwise from the vertical position to an incline position. A node 46 is provided at the outer surface of the sleeve bearing 40 of the rotational joint. Node 46 makes contact with vehicle body and stops the rotation of frame unit 1 when frame unit 1 reaches the incline position (i.e., say 45 degree). At such an incline position (i.e., say 45 degree), license plate can be inserted into or removed out of frame unit 1 through slot opening 8, but can not possibly slip out of frame unit 1. Since frame unit 1 can not possibly rotate 90 degree from the vertical position to the horizontal position (i.e., position for engaging or disengaging the rotational joint), the rotational joints can not possibly be disconnected after the module unit being mounted to vehicle body.

It is understood that a cavity and a through hole must be prefabricated in the vehicle body before mounting the module unit to vehicle body. The cavity provides a space to conceal the rearward extended right and left mid sections 29 and 30 of cross plate 25 of base unit 21. The through hole allows cylindrical bearing 34 of releasing unit 33 to penetrate through vehicle body. A rubber seal around the through hole is recommended to ensure a water-tight penetration of vehicle body.

The frame unit 1 is releasable from the vertical locked position to the incline position (i.e. say 45 degree) by activating the releasing unit 33. The releasing unit 33 (FIG. 4) can only be activated by pushing the push button 37 that is located in the interior side of vehicle. Upon activating the releasing unit 33 by pushing the push button 37, the top face of projectile 36 of the releasing unit 33 begins to engage with the top face of projectile 16 of the locking unit 9. Consequently, "L-hooks" 15 of locking unit 9 is moved to the extreme right position (i.e., unlocked position) as soon as projectiles 36 and 16 being completely engaged. As a result, frame unit 1 is released from the vertical locked position to the inclined position. When frame unit 1 is at the incline position (i.e. say 45 degree), the top slot opening 8 of frame unit 1 is no longer blocked by top side plate 24 of the base unit 21. This allows license plate be removed out of or inserted into frame unit 1.

Figure 5:
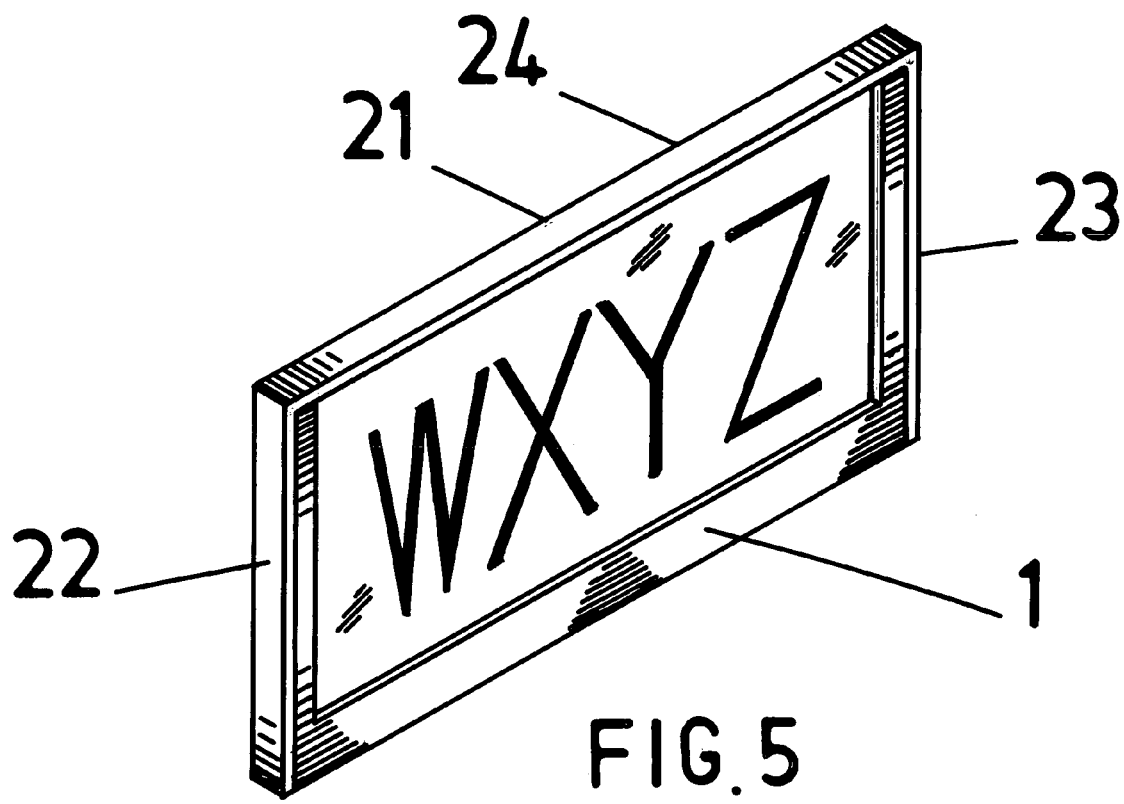
FIG. 5 is a front perspective view of the module unit in the first preferred embodiments of present invention.

FIG. 5 shows a perspective front view of the module unit in the first preferred embodiments of present invention at vertical position, in which, a license plate is retained within frame unit 1 at vertical position. The front sides of the frame structure of frame unit 1 are flush with the front sides of the frame structure of base unit 21. It is understood that a cavity and a through hole must be prefabricated in the vehicle body before mounting the module unit to vehicle body. The cavity provides a space to conceal the rearward extended right and left mid sections 29 and 30 of cross plate 25 of base unit 21 (FIG. 3). The through hole allows cylindrical bearing 34 of releasing unit 33 (FIG. 4) to penetrate through vehicle body. After the module unit being mounted to vehicle body, the rear sides of the right, left and top side plates 22, 23 and 24 of base unit 21 are flush with the exterior surface of the vehicle body. It can be noticed in FIG. 5 that there are no visible mechanical fasteners, rotational joints, locking unit or releasing unit shown in the front appearance of the module unit. This dramatically enhances the appearance of the module unit.

Figure 6:
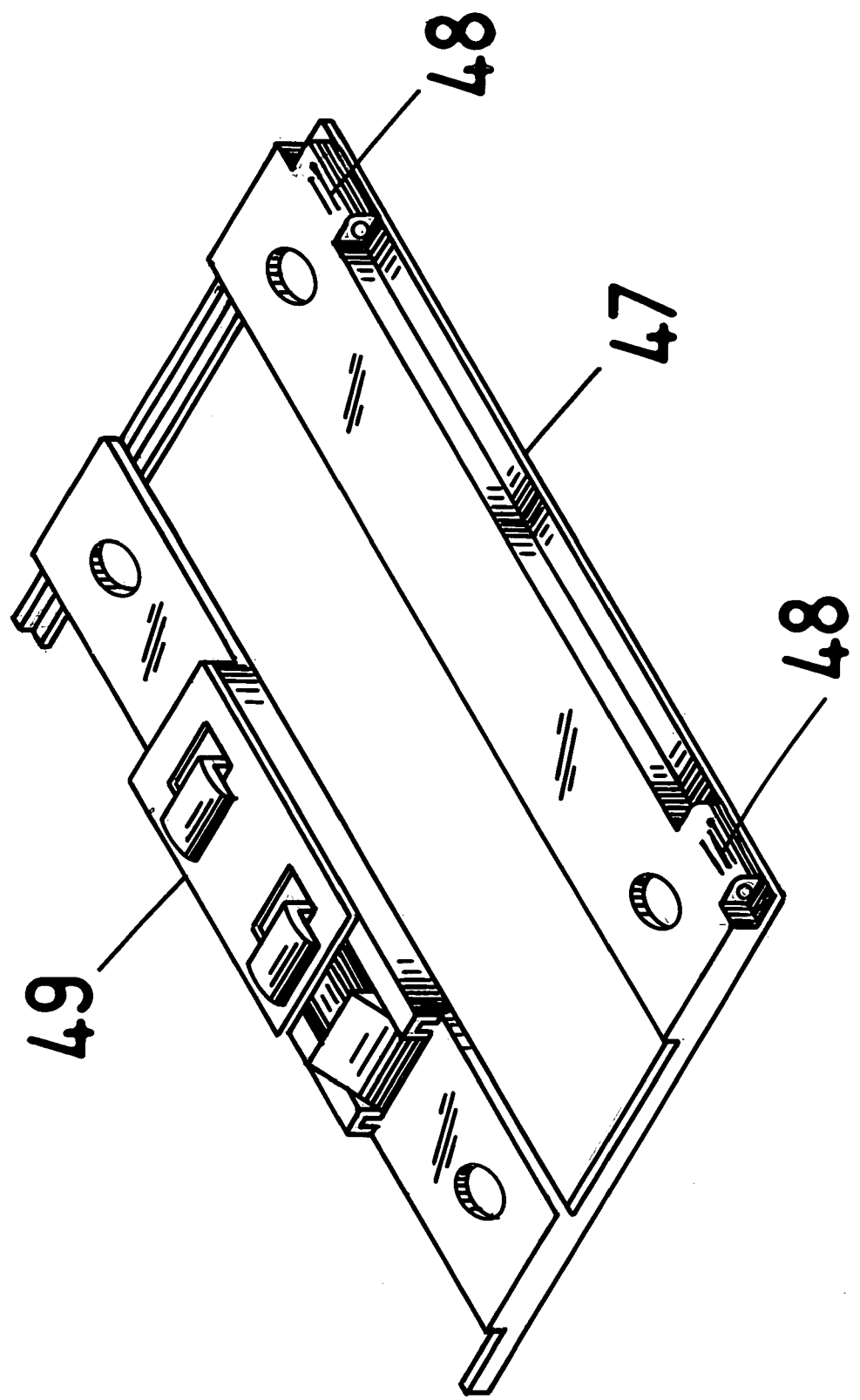
FIG. 6 is a rear perspective view of the frame unit in the second preferred embodiments of present invention.

FIG. 6 shows a rear perspective view of the rotating frame unit 47 in the second preferred embodiments of present invention in a horizontal position, with the front of frame unit 47 facing downward. The frame unit 47 is identical to frame unit 1 of the first preferred embodiments shown in FIG. 1, with an exception that frame unit 47 incorporates a pair of new rotational joints. The new rotational joint is in the form of a sleeve bearing 48 that is integrally connected to the bottom of frame unit 47. The frame unit 47 incorporates a locking unit 49 that is identical to locking unit 9 in the first preferred embodiments of present invention.

Figure 7:
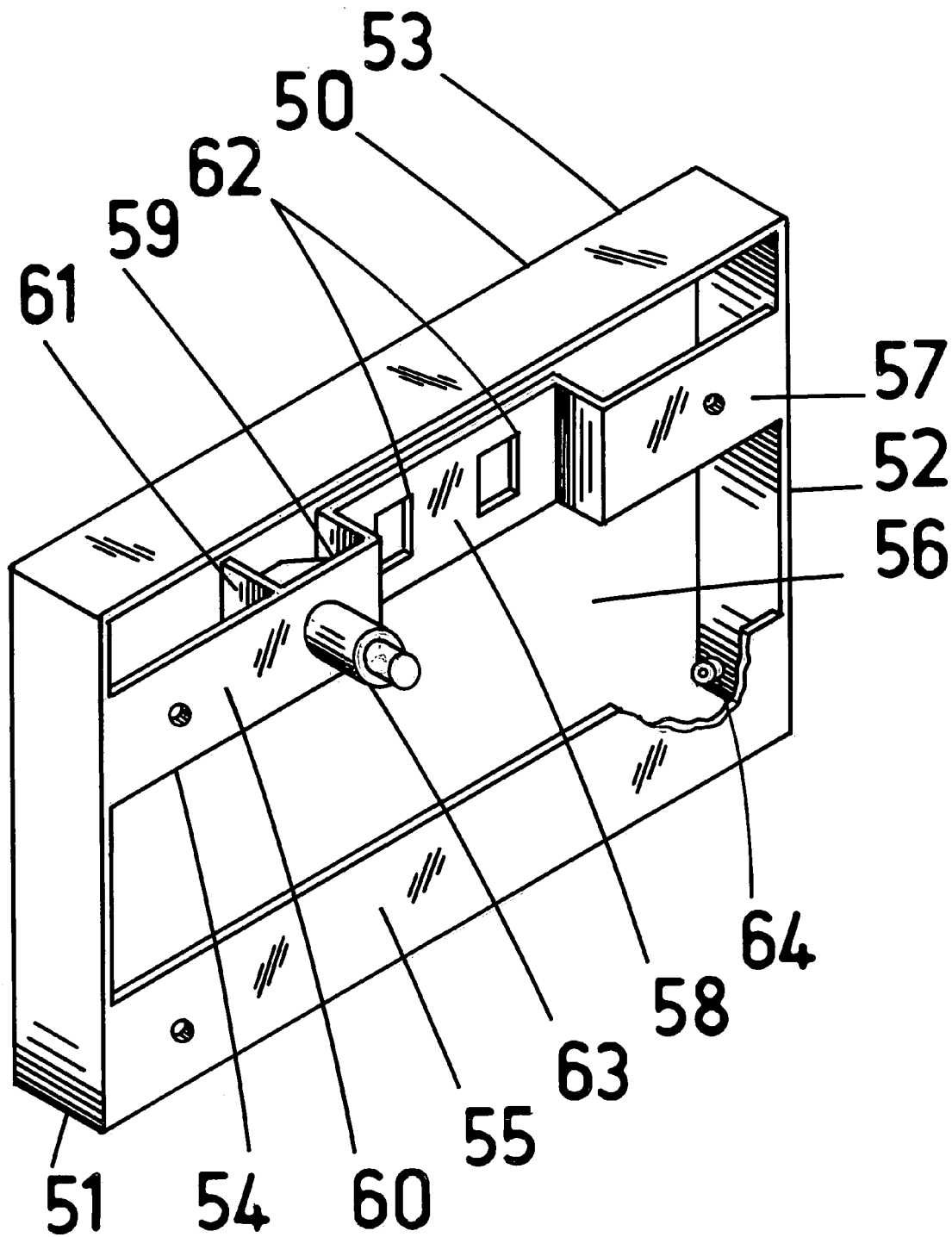
FIG. 7 is a rear perspective view of the base unit in the second preferred embodiments of present invention.

FIG. 7 shows a rear perspective view of the stationary base unit 50 in the second preferred embodiments of present invention in a vertical position. The base unit 50 consists of a vertical left side plate 51, a vertical right side plate 52, a horizontal top side plate 53, and a first and second rear side cross plates 54 and 55, which are integrally connected in the form of an integral frame structure with a central cavity 56. The cross plate 54 is divided into four sections, i.e., a right section 57, a right mid section 58, a left mid section 59, and a left section 60. A vertical partition wall 61 is provided between left mid section 59 and left section 60. The right mid section 58 is extended forward with a pair of windows 62. The left mid section 59 incorporates a releasing unit 63 that is identical to the releasing unit 33 in the first preferred embodiments of present invention. With an exception of the right mid section 58, the rear sides of the entire frame structure of base unit 50 are flush to the exterior surface of the vehicle body when base unit 50 is attached to the vehicle body. A pair of sleeve bearings 64 are provided within base unit 50.

Frame unit 47 (FIG. 6) and base unit 50 (FIG. 7) are pivotally connected together to form a module unit by inserting a bolt (not shown) through the center holes of sleeve bearings 48 and 64. After the module unit being pivotally connected, frame unit 47 can rotate clockwise from the horizontal position to the vertical position. Wherein, locking unit 49 of frame unit 47 locks frame unit 47 at vertical position in the same manner as the first preferred embodiments. Frame unit 47 can rotate counter clockwise from the vertical position to an incline position. Preferably, the incline position of frame unit 47 is restricted by installing a stop pin (not shown) in the base unit 50. At such a restricted incline position (i.e. say 45 degree), license plate can be manually inserted into or removed out of frame unit 47, but can not possibly slip out of frame unit 47.

Figure 8:
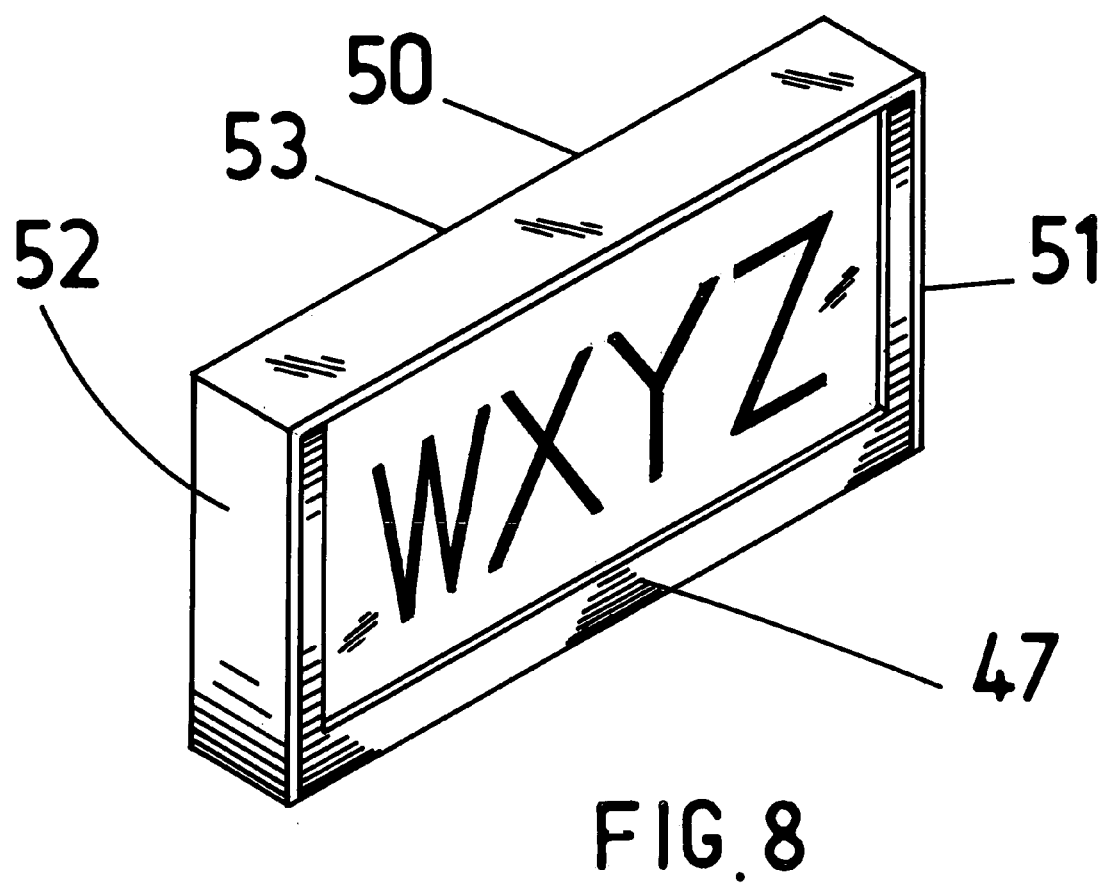
FIG. 8 is a front perspective view of the module unit in the second preferred embodiments of present invention.

FIG. 8 shows a perspective front view of the module unit in the second preferred embodiments of present invention at vertical position, in which, a license plate is retained within frame unit 47 at vertical position. The front sides of the frame structure of frame unit 47 are flush with the front sides of the frame structure of base unit 50. The module unit of the second preferred embodiments can be mounted to vehicle body in two methods. In the first method, a cavity and a through hole is prefabricated in the vehicle body. The through hole allows releasing unit 63 to penetrate vehicle body. The cavity is in a size substantially equivalent to that of base unit 50. When the module unit is mounted to vehicle body, the entire frame structure of base unit 50 is concealed within the cavity so that, preferably, the front sides of the vertical side plates 51 and 52, and the front side of horizontal top plate 53 of base unit 50 are flush with the exterior surface of vehicle body surrounding the cavity. In the second method, only a through hole is prefabricated in the vehicle body. The through hole allows releasing unit 63 to penetrate vehicle body. The module unit is directly mounted to the exterior surface of vehicle body so that the rear sides of plates 51, 52 and 53 of base unit 50 are flush with the exterior surface of vehicle body.

Figure 9:
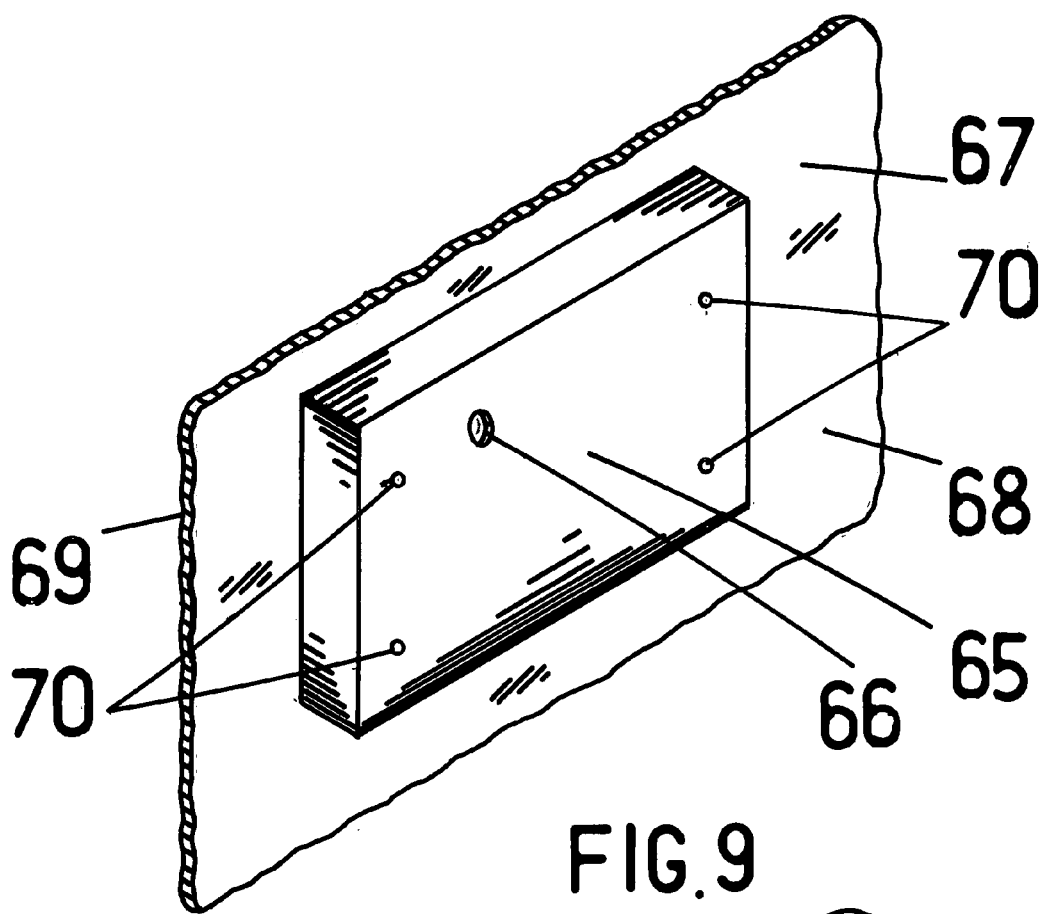
FIG. 9 is a rear perspective view of the cavity fabricated in a vehicle body for concealing the base unit of FIG. 7.

FIG. 9 shows a rear perspective view of the cavity 65 and the through hole 66 fabricated in the vehicle body 67. Cavity 65 is extended outward from the interior surface 68 of vehicle body 67. The entire base unit 50 (in FIG. 7) fits nicely within the space enclosed by cavity 65, and is fastened to the exterior surface 69 of vehicle body 67 by fitting mechanical fasteners into the fastening holes 70. Through hole 66 provides a passage for the cylindrical bearing 34 of the releasing unit 63 (in FIG. 4) penetrating vehicle body 67.

Figure 10:
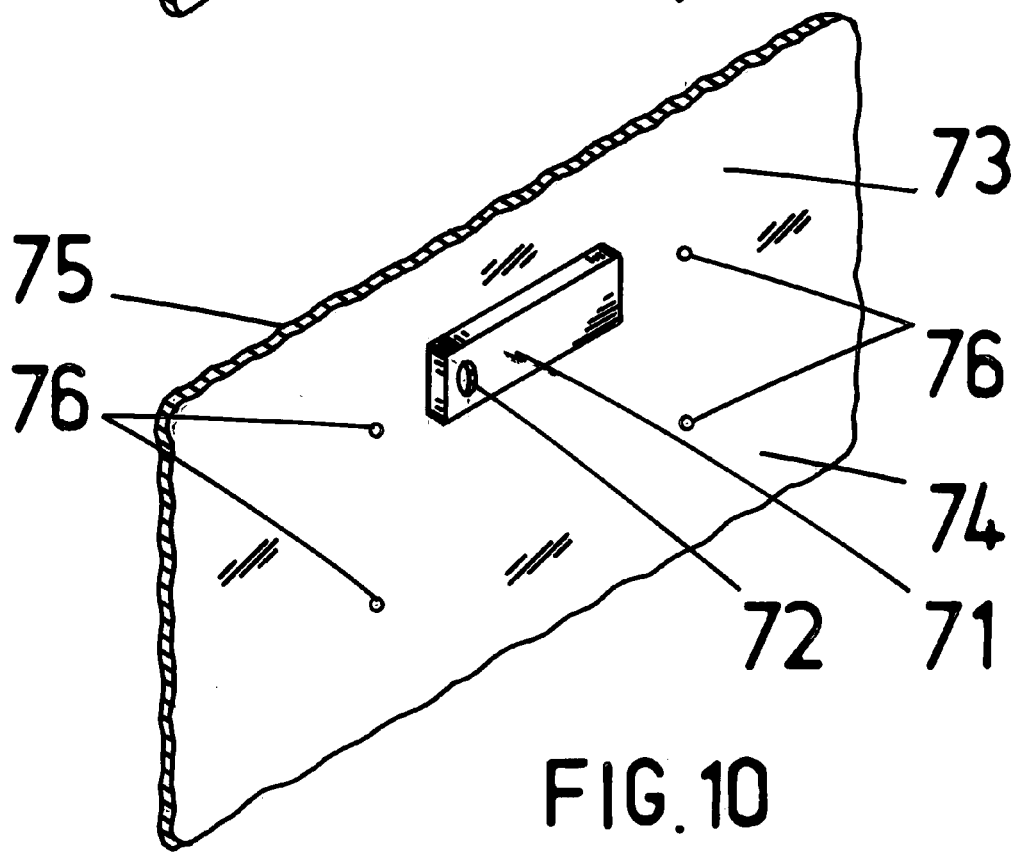
FIG. 10 is a rear perspective view of the cavity fabricated in a vehicle body for concealing the rearward extended portion of the base unit of FIG. 3.

FIG. 10 shows a rear perspective view of the cavity 71 and the through hole 72 fabricated in the vehicle body 73. Cavity 71 is extended outward from the interior surface 74 of vehicle body 73. The rearward extended portion of base unit 21 (in FIG. 3) fits nicely within the space enclosed by cavity 71, and base unit 21 is fastened to the exterior surface 75 of vehicle body 73 by fitting mechanical fasteners into the fastening holes 76. Through hole 72 provides a passage for the cylindrical bearing 34 of the releasing unit 63 (in FIG. 4) penetrating vehicle body 73.

The module unit in the above first or second preferred embodiments protects the license plate from being removed by an un-authorized person when the frame unit retains and displays the license plate at a vertical position. Such a module unit can be further modified so that it not only protects the license plate, but also protects the annual registration stickers of the license plate from being removed by an un-authorized person. By law, annual registration stickers must be displayed at the top right and left corners of the license plate. The module unit in the above first or second preferred embodiments can be modified by installing a transparent cover sheet at the front of the frame unit. The transparent cover sheet can be in a full size of license plate, or in a reduced size just to cover the top right and left corners of the license plate.

Figure 11:
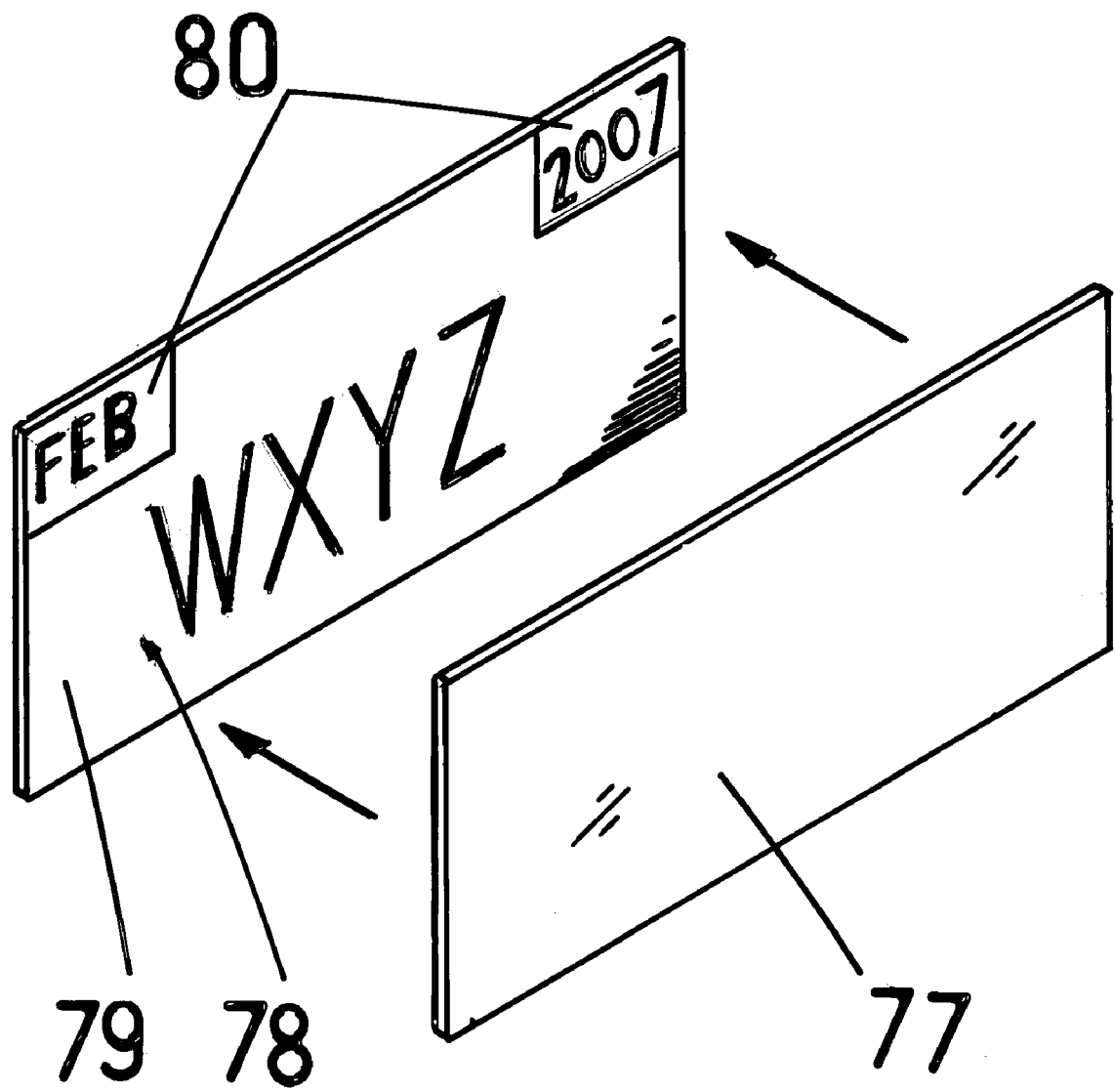
FIG. 11 is a perspective view of a transparent cover plate for protecting a license plate and annual registration stickers.

FIG. 11 shows a perspective view of a transparent cover plate 77. The transparent cover plate 77 is in an equivalent size and shape of a license plate 78. The transparent cover plate 77 is placed against the front surface 79 of license plate 78 when both the transparent cover plate 77 and the license plate 78 are inserted into the frame unit of present invention (in FIG. 1 or FIG. 3). Therefore, the annual stickers 80 are protected by the transparent cover plate 77 without a possibility of being removed when license plate 78 is retained by the module unit of present invention at locked vertical display position. As a result, the annual registration stickers can only be removed from or attached to license plate when license plate is removed out of the frame unit. It is understood that it is not the intend of present invention to describe all possible configurations of the module unit. For example, slot opening of frame unit and rotational joints in the above first or second preferred embodiments can be alternatively located at the opposite sides of frame unit so that frame unit rotates horizontally around a vertical axis. For another example, the first and second rear side cross plates of frame unit or base unit can be alternatively combined into a large rear side plate. Therefore, a modification or deviation in the configuration of the module unit as described in the above first or second preferred embodiments is considered within the scope and spirit of present invention.

What is claimed is:

1. A module unit capable of retaining and displaying a vehicle license plate, and preventing said license plate from being removed by an un-authorized person, in which:

Said module unit having a stationary base unit, a rotating frame unit, a rotating means, a locking means, and a releasing means; and Said base unit being fixedly attached to the exterior surface of a trunk door body or a rear door body of a vehicle by means of mechanical fasteners; and Said frame unit having an integrally connected frame structure capable of peripherally retaining said license plate, wherein, a slot opening providing the sole ingress and egress for inserting and removing said license plate into and out of said frame unit; and Said frame unit capable of rotating to a closed position, wherein, said frame unit retaining and displaying said license plate at a vertical position, said slot opening being blocked so that said license plate can not possibly be removed out of said frame unit through said slot opening, and said locking means being engaged into a locked position so that said frame unit is locked at said closed position; and Said releasing means penetrating through said vehicle body so that said releasing means can solely be activated from the interior side of said vehicle, and said releasing means capable of disengaging said locking means to an unlocked position by activating said releasing means from said interior side of said vehicle; and Said frame unit capable of being departed from said closed position to an open position when said locking means being disengaged into said unlocked position by activating said releasing means from said interior side of said vehicle, wherein, said slot opening of said frame unit being opened so that said license plate can be removed out of said frame unit through said slot opening; and Said rotating means capable of rotating said frame unit between said open position and said closed position; and Said rotating means, said locking means, said releasing means, and said mechanical fasteners for attaching said base unit to said vehicle body being concealed within said module unit without a possibility of being tampered by said un-authorized person when said frame unit being at said closed position.

2. The module unit according to claim 1, in which:

Said slot opening of said frame unit being located at a top side of said frame unit, said rotating means being located at a bottom side of said frame unit so that said frame unit rotates vertically around a horizontal axis.

3. The module unit according to claim 1, in which:

Said slot opening and said rotating means being located at opposite sides of said frame unit so that said frame unit rotates horizontally around a vertical axis.

4. The module unit according to claim 1, in which:

Said vehicle body being fabricated with a through hole, and said releasing means penetrating said vehicle body through said through hole so that said releasing means can be solely activated from said interior side of said vehicle.

5. The module unit according to claim 1, in which:

Said vehicle body being fabricated with a cavity in a size substantially equivalent to the size of said base unit, wherein, said cavity being an integral part of said vehicle body and forming a continuous boundary between the exterior and interior sides of said vehicle, and said base unit fitting nicely within said cavity when said base unit being fixedly attached to said vehicle body.

6. The module unit according to claim 1, in which:

Said vehicle body being fabricated with a cavity in a size substantially smaller than the size of said base unit, wherein, said cavity being an integral part of said vehicle body and forming a continuous boundary between the exterior and interior sides of said vehicle, and said locking and releasing means of said module unit fitting nicely within said cavity when said base unit being fixedly attached to said vehicle body.

7. The module unit according to claim 1, in which:

Said rotating means comprising of a sleeve bearing that is an integral part of said frame unit, and an axis bar that is an integral part of said base unit, wherein, said axis bar being engaged into said sleeve bearing through a slot cutoff of said sleeve bearing so that said axis bar forms a rotation axis of said rotating means.

8. The module unit according to claim 1, in which:

Said rotating means comprising of a first sleeve bearing that is an integral part of said frame unit, and a second sleeve bearing that is an integral part of said base unit, wherein, said first and second sleeve bearings being connected by inserting a connecting rod through center holes of said first and second sleeve bearings so that said connecting rod forming a rotation axis of said rotating means.

9. The module unit according to claim 1, in which:

Said locking means being fixedly attached to said frame unit, having at least a sliding hook and a spring coil, wherein, said sliding hook capable of engaging and interlocking with said base unit when said locking means being engaged into said locked position, said sliding hook capable of being disengaged and departed from said base unit when said locking means being disengaged to said unlocked position, and said spring coil capable of automatically returning said locking means from said unlocked position to said locked position.

10. The module unit according to claim 1, in which:

Said releasing means being fixedly attached to said base unit, having at least a sliding rod and a spring coil, wherein, said sliding rod capable of disengaging said locking means to said unlocked position when said releasing means being activated to an activated position, said sliding rod capable of engaging said locking means to said locked position when said releasing means being released from said activated position to an inactivated position, and said spring coil capable of automatically returning said releasing means from said activated position to said inactivated position.

11. The module unit according to claim 1, in which:

Said module unit having a means of restricting said open position of said frame unit so that said license plate can not possibly slip out of said frame unit through said slot opening of said frame unit when said frame unit being at said open position.

12. The module unit according to claim 1, in which:

Said frame unit having a transparent front cover sheet for covering the annual registration stickers of said license plate so that said annual registration stickers can not be possibly removed by said un-authorized person when said frame unit being at said closed position, and said annual registration stickers can be removed from or attached to said license plate after said license plate being removed out of said frame unit at said open position.

* * * * *